(12) United States Patent
Baeumchen

(10) Patent No.: US 10,458,098 B2
(45) Date of Patent: Oct. 29, 2019

(54) CONSTRUCTION MACHINE HAVING A MONITORING DEVICE

(71) Applicant: Volvo Construction Equipment Germany GmbH, Konz-Könen (DE)

(72) Inventor: Henning Baeumchen, Ottweiler (DE)

(73) Assignee: Volvo Construction Equiptment Germany GmbH, Konz-Könen (DE)

( * ) Notice: Subject to any disclaimer, the term of this patent is extended or adjusted under 35 U.S.C. 154(b) by 200 days.

(21) Appl. No.: 14/765,465

(22) PCT Filed: Apr. 22, 2013

(86) PCT No.: PCT/EP2013/001194
§ 371 (c)(1),
(2) Date: Aug. 3, 2015

(87) PCT Pub. No.: WO2014/121810
PCT Pub. Date: Aug. 14, 2014

(65) Prior Publication Data
US 2015/0368881 A1    Dec. 24, 2015

(30) Foreign Application Priority Data
Feb. 6, 2013   (DE) ................. 10 2013 002 079

(51) Int. Cl.
H04N 7/18         (2006.01)
H04N 5/247        (2006.01)
(Continued)

(52) U.S. Cl.
CPC ................ *E02F 9/261* (2013.01); *B60R 1/00* (2013.01); *H04N 5/2253* (2013.01);
(Continued)

(58) Field of Classification Search
CPC .... E02F 9/261; E02F 3/32; E02F 9/24; H04N 5/2253; H04N 5/247; H04N 7/181;
(Continued)

(56) References Cited

U.S. PATENT DOCUMENTS 7,446,337 B2    12/2008  Sawada et al.
7,605,692 B2 *  10/2009  Yamada ................... E02F 9/26
                                                  340/425.5
(Continued)

FOREIGN PATENT DOCUMENTS

DE       9317225 U1    1/1994
EP       2181898 A1    5/2010
(Continued)

OTHER PUBLICATIONS

International Search Report corresponding to PCT/EP2013/001194 dated Sep. 18, 2013, three pages.
(Continued)

*Primary Examiner* — Susan E. Hodges
(74) *Attorney, Agent, or Firm* — Kilpatrick Townsend & Stockton LLP

(57) ABSTRACT

Construction machine having a running-gear mechanism, a functional component, having a chassis with a cab for a driver, and monitoring cameras connected to at least one monitor in the cab in order to provide visual monitoring of work carried out adjacent to the machine, each camera having wide-angle lenses to monitor around the machine, a first camera to monitor the rear side of the machine with the camera directed in an inclined in relation to the plane (X) on which the machine stands, a second camera for monitoring the left-hand side of the machine and a third camera for monitoring the right-hand side of the machine, the second and third cameras being installed in upper left-hand and right-hand corner regions in relation to the front side of the
(Continued)

Figure 1:
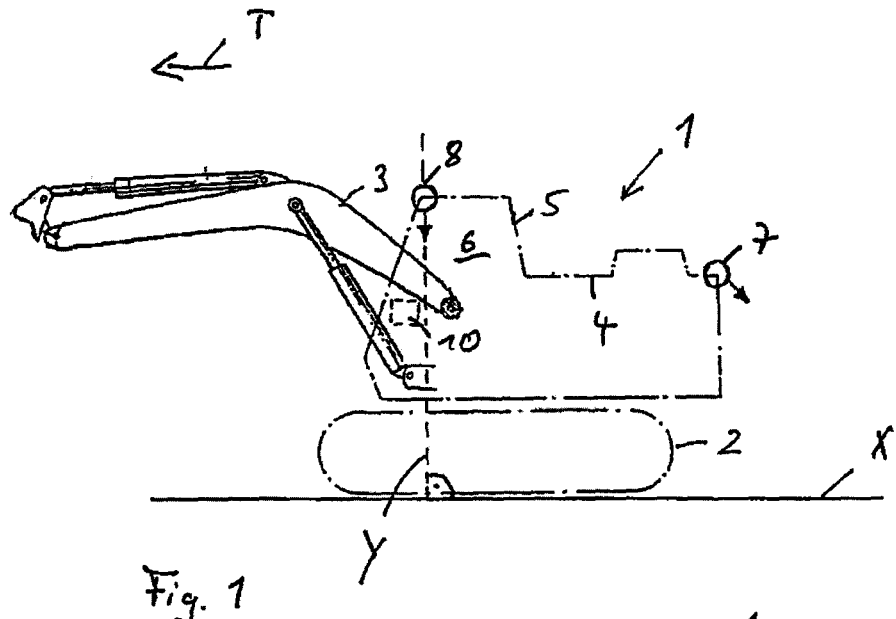

machine with each directed at an angle of .+−.5.degree. in relation to the vertical (Y) of the plane (X) on which the machine stands.

6 Claims, 5 Drawing Sheets

(51) Int. Cl.
  *B60R 1/00* (2006.01)
  *E02F 9/26* (2006.01)
  *H04N 5/225* (2006.01)
(52) U.S. Cl.
  CPC ............ *H04N 5/247* (2013.01); *H04N 7/181* (2013.01); *B60R 2300/105* (2013.01); *H04N 2005/2255* (2013.01)
(58) Field of Classification Search
  CPC .............. H04N 2005/2255; B60R 1/00; B60R 2300/105; B60R 2300/303; E01C 19/00
  USPC ........................................................ 348/148
  See application file for complete search history.

(56) References Cited

U.S. PATENT DOCUMENTS

| | | | | |
|---|---|---|---|---|
| 7,974,444 | B2* | 7/2011 | Hongo | B60R 1/00 |
| | | | | 280/656 |
| 8,272,467 | B1* | 9/2012 | Staab | E02F 9/26 |
| | | | | 172/2 |
| 9,233,643 | B2* | 1/2016 | Kiyota | B60R 1/00 |
| 2006/0061656 | A1* | 3/2006 | Lang | B60R 1/12 |
| | | | | 348/148 |
| 2006/0066835 | A1* | 3/2006 | Laufer | B60R 1/00 |
| | | | | 356/3 |
| 2011/0216193 | A1* | 9/2011 | Shim | G03B 15/00 |
| | | | | 348/143 |
| 2013/0222573 | A1* | 8/2013 | Onuma | E02F 9/24 |
| | | | | 348/82 |
| 2014/0118533 | A1* | 5/2014 | Chang | G06T 3/4038 |
| | | | | 348/118 |
| 2014/0375814 | A1* | 12/2014 | Ishimoto | B60R 1/00 |
| | | | | 348/148 |

FOREIGN PATENT DOCUMENTS

| | | |
|---|---|---|
| JP | 2004322979 A | 11/2004 |
| JP | 112004002539 T5 | 11/2006 |
| JP | 2008240362 A | 10/2008 |
| JP | 2010121270 A | 6/2010 |
| JP | 2012188899 A | 10/2014 |
| WO | WO2012/053105 A1 | 4/2012 |

OTHER PUBLICATIONS

German Examination Report corresponding to DE 102013002079.4 filed Feb. 6, 2013.
Written Opinion corresponding to PCT/EP2013/001194, seven pages.

* cited by examiner

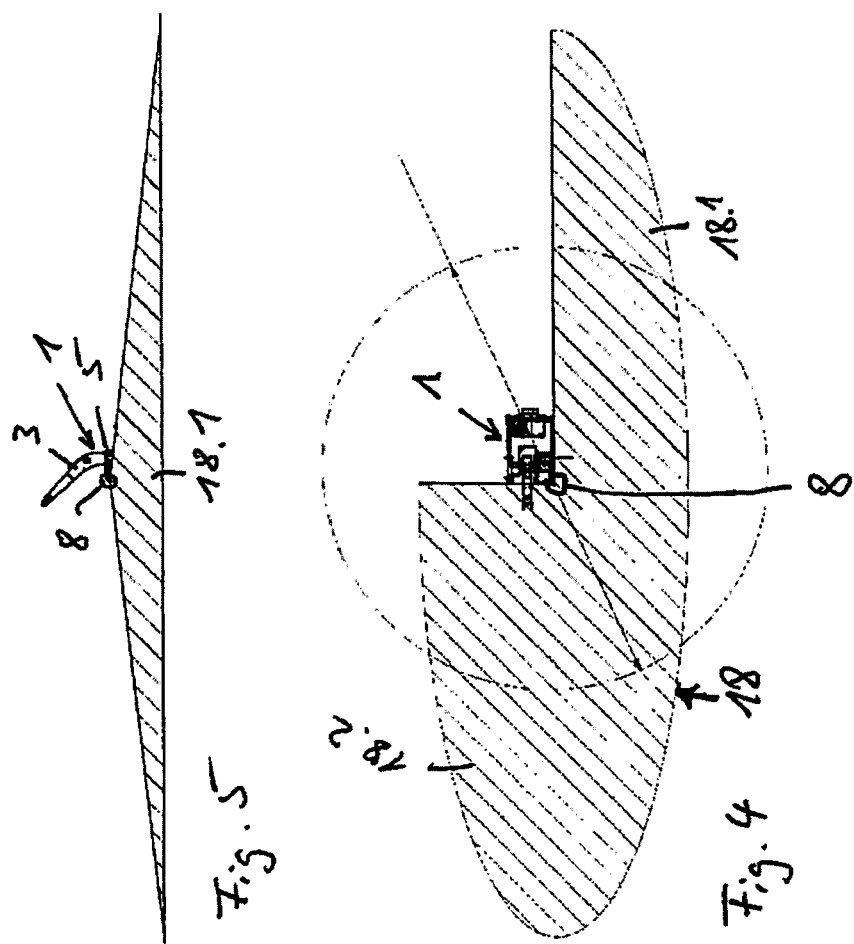

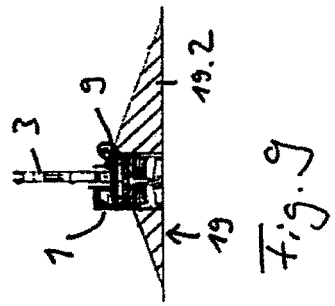
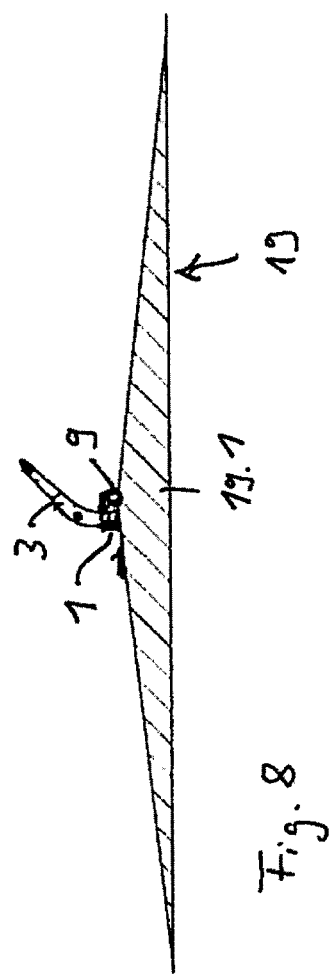
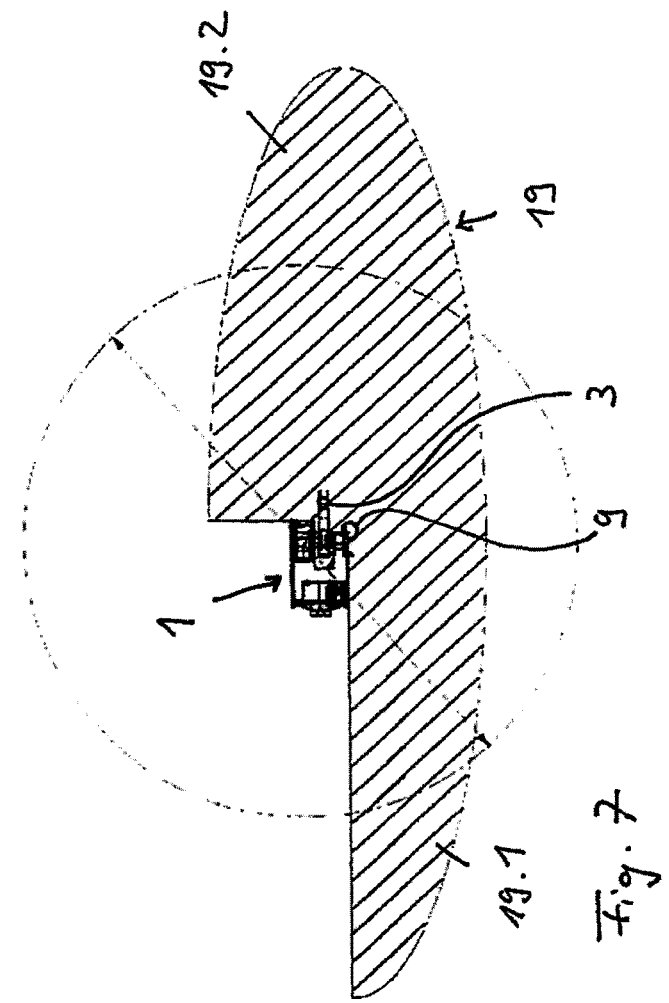

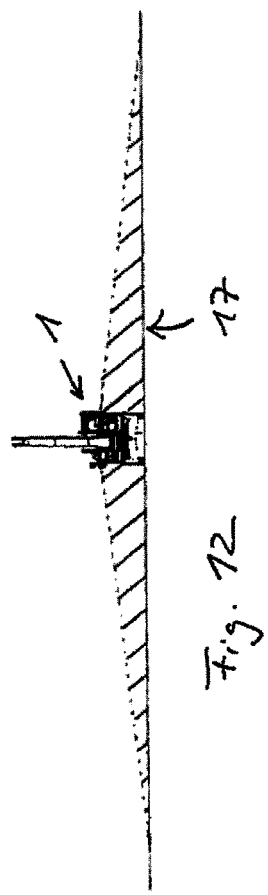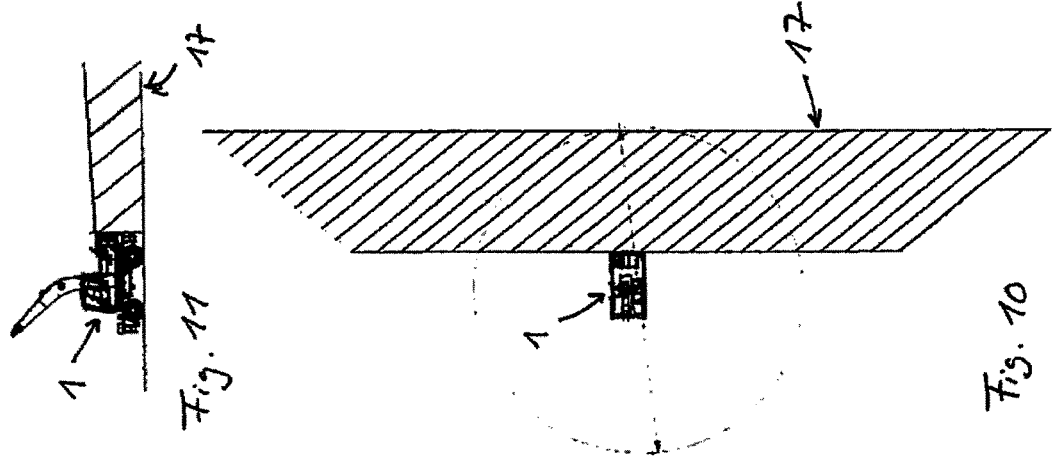

CONSTRUCTION MACHINE HAVING A MONITORING DEVICE

The invention relates to a construction machine, in particular an excavating machine, loading machine, milling machine, rolling machine, finishing machine or transportation machine according to the preamble of claim 1.

DE 93 17 225 U1 discloses a road paving and finishing machine having a chassis which has an undercarriage. In addition to functional components such as a paving screed, a cab with a driver's position accommodated therein is arranged on the chassis. In order to be able to monitor visually the operation of the paving screed and/or other functional components to the side or to the rear of the finishing machine, cameras are arranged at suitable locations which are connected to at least one monitor arranged in the cab. It proves disadvantageous that the visualization of the regions to be monitored outside the machine by the camera regions is patchy despite signal processing of the images generated.

U.S. Pat. No. 7,466,337 discloses mounting a rear view camera for improving a monitoring region, between a travelling section unit and a rotational structure of an excavator. The position of the rear view camera is then lower and is additionally protected against environmental influences. Obstacles in the reversing region are thereby detected better and in a way that involves less maintenance.

DE 11 2004 002 539 T5 discloses attaching monitoring cameras for camera regions at desired positions of the construction machine. The camera regions can be arranged in order to monitor the rear side, the front side and the sides of the construction machine. Since a monitoring camera is used as an auxiliary device for carrying out work during which a construction machine can be used safely and simply, a display for presenting the image of the camera in a driver's cab is provided. However, the space of the driver's cab is limited, with the result that a separate screen (monitor) only for the camera images would result in additional obstruction of the view, since a monitor is already present for displaying measured values of the parameters necessary to perform operator control of the machine. It is therefore known to provide a switchover mode, between a measured value display mode and a camera display mode, for just one monitor.

The monitoring cameras are not fixed here but instead permit movement of the photographing position, in order to avoid limiting the monitoring region. With such a camera control unit, the posture of the camera can be changed and a focussing mechanism for a zoom lens of a camera can be controlled. A multiplicity of mounting positions are provided as mounting locations, wherein a multiplicity of camera regions can be mounted at one location. The photographing direction of all the mounted cameras is inclined with respect to the surface normals through the fixing point of the mounting location. The position of a blind spot in the field of operation of the construction machine can therefore be covered by the camera regions, for which purpose the image data which is photographed by the camera regions is sent to an image input region of the monitor. The multiplicity of camera regions which are necessary to permit the operator of the machine to view blind spots in the outside region around the construction machine during the operation of the construction machine are disadvantageous.

The invention is therefore based on the object of providing a construction machine whose mounted monitoring cameras permit improved monitoring of a hazardous region around the construction machine.

This object is achieved by means of the features of claim 1.

As a result, a construction machine is provided which provides, with only at least three mounting locations for only at least three camera regions, a visualization system which permits the driver in the cab to view even such regions which are not within the driver's field of vision. This considerably reduces a hazard presented by the construction machine, which has to a certain extent poor visibility for functional reasons, since the peripheral points of the exterior space around the construction machine can be perceived visually by the driver.

The quality of the visual perception is significantly improved herein according to the invention. This is because the mounting locations, selected according to the invention, for the monitoring cameras generate, in conjunction with their photographing direction selected according to the invention and their optical systems selected according to the invention, image recordings which result in uniform visual imaging of the outside space around the construction machine.

In fact, the image fields of the camera regions overlap only partially, as a result of which seams between the image fields of different camera regions are minimized. It has been surprisingly found according to the invention that an increase in the number of camera regions does not improve the quality of the optical imaging but instead a reduction in said number by reducing the seams between overlapping image regions of adjacent camera regions. Image processing of the camera regions according to the invention therefore brings about fewer seam-induced vision errors. In particular, seams of the image fields of lateral camera regions are additionally less critical here since they are located mainly in front of the construction machine in the driver's direct field of vision.

The visualization system according to the invention can be used in any type of construction machine, wherein the construction machines include in particular excavating machines, loading machines, milling machines, rolling machines or road paving and finishing machines.

Further refinements of the invention can be found in the following description and the dependent claims.

Figure 2:
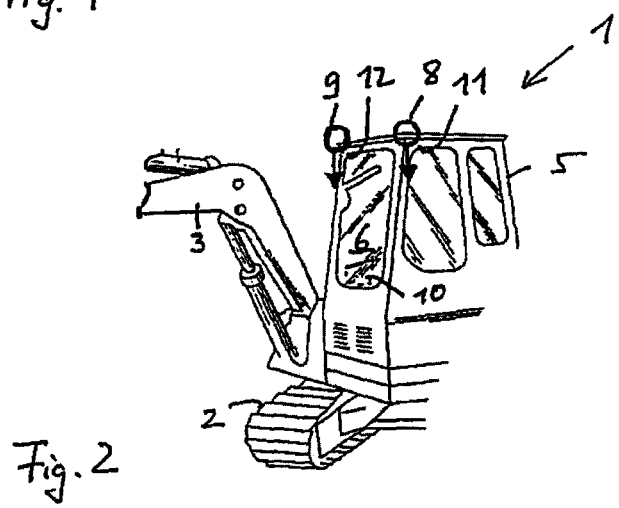
Figure 3:
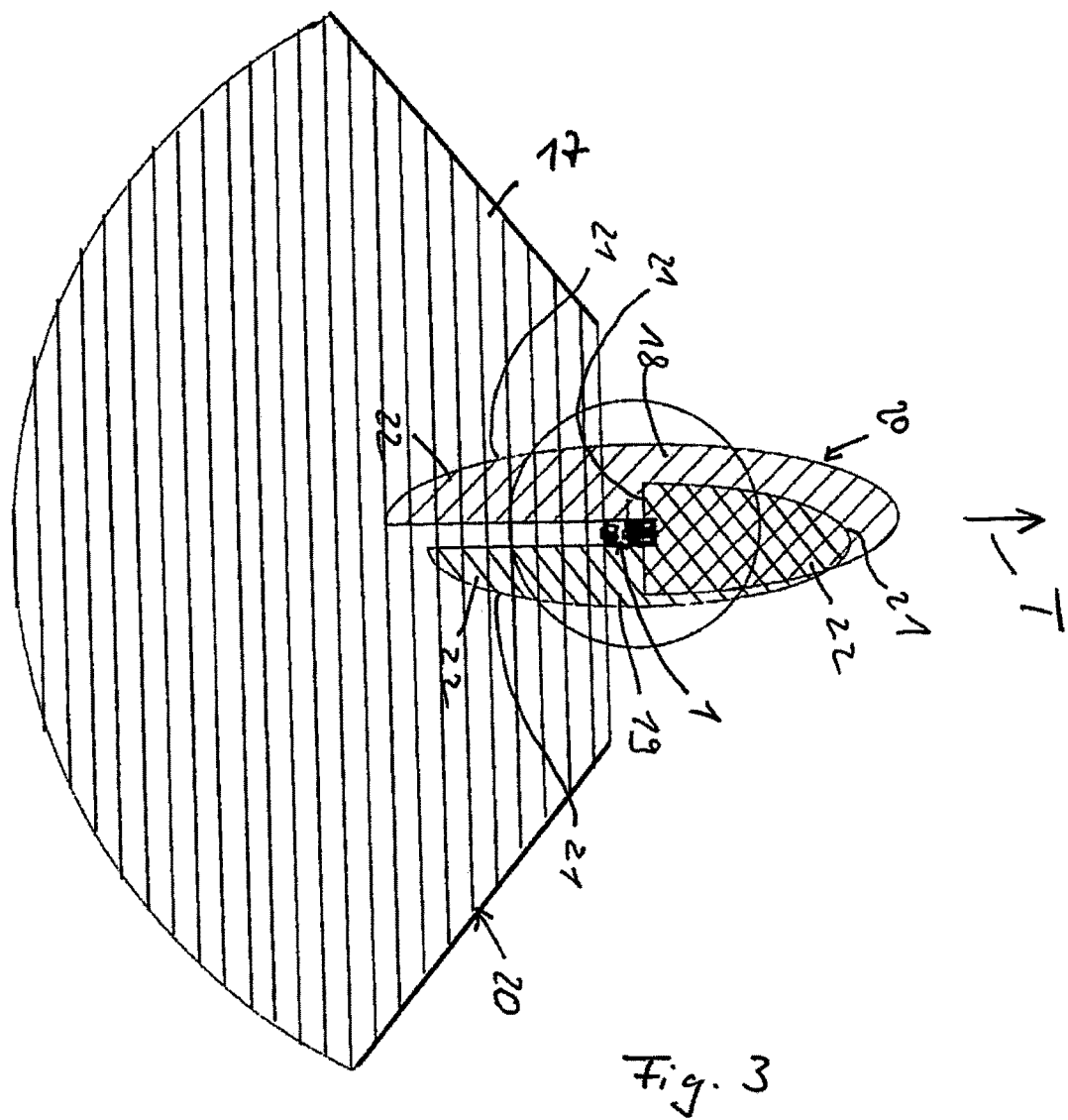

The invention will be explained in more detail below on the basis of the exemplary embodiments illustrated in the appended figures. In the drawings:

FIG. 1 is a schematic side view of a construction machine in the form of an excavator, in which view the arrangement of monitoring cameras is shown, FIG. 2 is a schematic perspective partial view obliquely from the front of a construction machine in the form of an excavator, in which view the arrangement of monitoring cameras is shown, FIG. 3 is a schematic plan view of the image fields of three camera regions for monitoring the external region around a construction machine in the form of an excavator, FIG. 4 is a schematic plan view of the image field of a side camera which is on the left-hand side in the direction of travel, FIG. 5 is a schematic side view of the image field of the side camera which is on the left-hand side in the direction of travel, FIG. 6 is a schematic front view of the image field of the side camera which is on the left-hand side in the direction of travel, FIG. 7 is a schematic plan view of the image field of a side camera which is on the right-hand side in the direction of travel, FIG. 8 is a schematic side view of the image field of the side camera which is on the right-hand side in the direction of travel, FIG. 9 is a schematic rear view of the image field of the side camera which is on the right-hand side in the direction of travel, FIG. 10 is a schematic plan view of the image field of a rear-mounted camera, FIG. 11 is a schematic side view of the image field of the rear-mounted camera and FIG. 12 is a schematic front view of the image field of the rear-mounted camera.

As is shown by FIG. 1 and FIG. 2, the invention relates to a construction machine 1 having an undercarriage 2, at least one functional component 3 and a chassis 4, on which a cab 5 for at least one driver's position 6 is arranged. The construction machine 1 here is, for example, an excavator. The functional component 3 is, for example, digging equipment in case of an excavator, as is shown by FIG. 1 and FIG. 2. The construction machine 1 can be any type of construction machine, in particular also a loading machine, milling machine, rolling machine or road paving and finishing machine. The construction machines also include here the transportation devices such as low loaders, construction-site dumper trucks with a loading face as a functional component etc.

As is also shown by FIG. 1 and FIG. 2 monitoring cameras 7, 8, 9, which are connected to at least one monitor 10 arranged in the cab 5, are mounted on the construction machine 1. The monitoring cameras 7, 8, 9 make it possible to monitor visually operations to the side as well as behind the construction machine 1.

At least three monitoring cameras 7, 8, 9 are provided which each have a wide-angle lens as an optical component for the real visual imaging of an outside area around the construction machine 1. With respect to their mounting location and their photographing direction, the monitoring cameras 7, 8, 9 are determined as follows.

As is shown by FIG. 1, a first monitoring camera 7 is a rear-mounted camera for monitoring the rear side of the construction machine 1, the camera region of which has a photographing direction inclined with respect to the installation plane X of the construction machine 1. The photographing direction is indicated by an arrow. The first monitoring camera 7 is preferably mounted at a raised position, for example on the cover of a counterweight of an excavator, so that a reversing region can be captured over a large area.

A second monitoring camera 8 is a side camera for monitoring the left-hand side of the construction machine 1 in the direction of travel T. As is shown by FIG. 1 in combination with FIG. 2, the third monitoring camera 9 is a side camera for monitoring the right-hand side of the construction machine in the direction of travel T. The mounting locations for the second and third monitoring cameras 8, 9 are located in an upper left-hand or right-hand corner region 11, 12 with respect to the front side of the machine 1. The camera regions of the second and third monitoring cameras 8, 9 each have a photographing direction which is located in an angular range ±5° with respect to the vertical Y of the installation plane X or the support surface of the machine 1, as is shown by FIG. 1. The corner regions 11, 12 can be arranged on the cab 5 as part of the machine 1.

The camera regions of the at least three monitoring cameras 7, 8, 9 result in image fields 17, 18, 19 for monitoring outside areas around the construction machine 1 which are combined by means of an image processing device as partial image fields to form one composite image 20, as is shown by FIG. 3. The composite image 20 contains sections 22 of two image fields 18, 19, or 17, 18 and 17, 19, which are bounded by seam lines 21. The number and length of the seam line 21 is comparatively low as a result of the use of only at least three monitoring cameras 7, 8, 9.

In the case of an exemplary embodiment of a construction machine 1 illustrated in FIG. 3 with at least three monitoring cameras 7, 8, 9, the second and third monitoring cameras 8, 9 are arranged at different height levels with respect to the installation plane X of the construction machine 1. The third monitoring camera 9 for monitoring the right-hand side of the construction machine 1 is arranged at a lower level than the second monitoring camera 8, as a result of which the image field 19 is made smaller with respect to its dimensions than the image field 18. For selectable adjustment of the mounting of the monitoring cameras 7, 8, 9 on the construction machine 1 the latter can be mounted in a slidable and/or rotatable fashion, specifically in the vertical and horizontal directions. The image fields 18, 19 and their seam lines 21 are adjustable with respect to one another so that the covering can be taken into account by a functional component 3.

FIG. 4 to FIG. 6 show the image field 18 of the second monitoring camera 8 for the left-hand side of the construction machine 1. As a result of the fact that the second monitoring camera 8 is mounted in the upper left-hand corner region 11 of the cab 5, the image field 18 is composed of a left-hand side region 18.1 and of a left-hand front region 18.2. The left-hand front region 18.2 is a front-side extent of the left-hand side region 18.1 with a front-side section.

FIGS. 7 to 9 show the image field 19 of the third monitoring camera 9 for the right-hand side of the construction machine 1. As a result of the fact that the third monitoring camera 9 is mounted in the upper right-hand corner region 12 of the cab 5, the image field 19 is composed of a right-hand side region 19.1 and a right-hand front region 19.2. The right-hand front region 19.2 is a front-side extent of the right-hand side region 19.1 with a front-side section.

The image fields 18, 19 additionally differ with respect to their spatial extent which results from a different height position of the monitoring cameras 8, 9 with respect to the installation plane X. The right-hand and left-hand corner regions 11, 12 of the cab 5 therefore relate to a correspondingly selectable spatial extent of the image fields 18, 19.

FIG. 10 to FIG. 12 show the image field 17 of the first monitoring camera 7 in the way which is known per se for reversing cameras. An advantage of the construction machine 1 according to the invention is consequently also that a first monitoring camera 7 is used which can also be used connected separately as a single reversing camera.

The image fields 17, 18, 19 of the monitoring cameras 7, 8, 9 are, as described above, determined on the one hand by the mounting location on the construction machine 1. However, another determining factor is also the wide-angle lens which is respectively used for the optical component of the optical imaging system of the monitoring cameras 7, 8, 9. The second and third monitoring cameras 8, 9 preferably have wide-angle lenses with image angles of at least 135° vertically and at least 130° horizontally.

The photographing direction of the second and third monitoring cameras 8, 9 is preferably in the angular range ±3° particularly preferably ±1.5° with respect to the vertical Y of the installation plane X of the construction machine. The photographing direction of the first monitoring camera 7 is preferably in an angular range ±15° with respect to a 45° inclination with respect to the installation plane X of the machine 1. The monitoring camera 7 can also be arranged in an angular range 0°-60° with respect to the installation plane X of the machine 1.

The circle illustrated by dashed lines in FIG. 4, FIG. 7 and FIG. 10 specifies, according to ISO5006 a radius of 12 m with respect to the centerpoint of the circle, in order to clarify the sizes of the image fields 17, 18, 19.

In addition to the at least three monitoring cameras 7, 8, 9 described above, further monitoring cameras can also be provided, in particular for additional or other monitoring purposes than the outside space around a construction machine 1.

The invention claimed is:

1. A construction machine having an undercarriage, at least one functional component, a chassis on which a cab for at least one driver's position is arranged, and having monitoring cameras which are mounted on the construction machine and are connected to at least one monitor which is arranged in the cab, in order to permit visual monitoring of operations to a side or rear of the construction machine, wherein at least three monitoring cameras are provided which each have wide-angle lenses with camera ranges, and wherein the camera ranges produce image fields for monitoring the outdoor areas around the construction machine, and which are determined in terms of their mounting position and their photographing direction wherein a first monitoring camera is a rear-mounted camera for monitoring a rear side of the construction machine, a camera range of the first monitoring camera has a photographing direction inclined with respect to an installation plane (X) of the construction machine, a second monitoring camera is a side camera for monitoring a left-hand side of the construction machine, and a third monitoring camera is for monitoring a right-hand side of the construction machine, the mounting position of which is located on an upper left-hand corner region or right-hand corner region of a front side of the construction machine, and wherein the camera ranges of the second and the third monitoring camera each have a photographing direction, being the camera's primary axis, pointing downwards in an angular range ±5° with respect to a vertical (Y) of the installation plane (X) of the construction machine, and the second monitoring camera and the third monitoring camera are mounted at different height levels with respect to the installation plane (X) of the construction machine, whereby their image fields are different with respect to their spatial extension, and the image fields of the at least three monitoring cameras are combinable by means of image processing to form one composite image, the composite image comprising a plurality of sections of overlapping portions of two of the image fields which are bounded by seam lines, wherein the image fields of the second and third monitoring camera overlap with each other in a direction of the front side of the construction machine and both overlap with the image field of the first monitoring camera, respectively, wherein the second monitoring and the third monitoring cameras create image fields as side cameras for monitoring the left-hand side and the right-hand side which are bounded by a seam line in front of the construction machine in a direction aligned with a driver's direct field of vision such that there are no blind spots in the direction aligned with the driver's direct field of vision, and wherein the second monitoring camera and the third monitoring camera have wide angle lenses with image angles of at least 135° vertically and at least 135° horizontally.

2. The construction machine as claimed in claim 1, wherein the photographing direction of the second monitoring camera and third monitoring camera is located in the angular range ±1.5° with respect to the vertical (Y) of the installation plane (X) of the construction machine.

3. The construction machine as claimed in claim 1, wherein the photographing direction of the first monitoring camera is located in an angular range ±15° with respect to a 45° inclination with respect to the installation plane (X) of the construction machine.

4. The construction machine as claimed in claim 1, wherein the monitoring cameras are slidably or rotatably mounted.

5. The construction machine as claimed in claim 1, wherein the construction machine is embodied as an excavating machine, loading machine, milling machine, rolling machine, finishing machine or transportation machine.

6. A construction machine having an undercarriage, at least one functional component, a chassis on which a cab for at least one driver's position is arranged, and having monitoring cameras which are mounted on the construction machine and are connected to at least one monitor which is arranged in the cab, in order to permit visual monitoring of operations to a side or rear of the construction machine, wherein at least three monitoring cameras are provided which each have wide-angle lenses with camera ranges, and wherein the camera ranges produce image fields for monitoring the outdoor areas around the construction machine, and which are determined in terms of their mounting position and their photographing direction wherein a first monitoring camera is a rear-mounted camera for monitoring a rear side of the construction machine, a camera range of the first monitoring camera has a photographing direction inclined with respect to an installation plane (X) of the construction machine, a second monitoring camera is a side camera for monitoring a left-hand side of the construction machine, and a third monitoring camera is for monitoring a right-hand side of the construction machine, the mounting position of which is located on an upper left-hand corner region or right-hand corner region of a front side of the construction machine, and wherein the camera ranges of the second and the third monitoring camera each have a photographing direction, being the camera's primary axis, pointing downwards in an angular range ±5° with respect to a vertical (Y) of the installation plane (X) of the construction machine, and the second monitoring camera and the third monitoring camera are mounted at different height levels with respect to the installation plane (X) of the construction machine, whereby their image fields are different with respect to their spatial extension, and the image fields of the at least three monitoring cameras are combinable by means of image processing to form one composite image, the composite image comprising a plurality of sections of overlapping portions of two of the image fields which are bounded by seam lines, wherein the image fields of the second and third monitoring camera overlap with each other in a direction of the front side of the construction machine and both overlap with the image field of the first monitoring camera, respectively, wherein the composite image formed from a combination of the image fields from each of the first monitoring camera, the second monitoring camera, and the third monitoring camera extends around an entirety of the exterior of the construction machine such that the composite image eliminates all blind spots proximate the construction machine in all directions.

\* \* \* \* \*